Sept. 20, 1960　　　　H. H. FORD　　　　2,953,062
AUTOMOTIVE VEHICLE OPTICAL SYSTEM
Original Filed April 28, 1951　　　　3 Sheets-Sheet 1

Inventor
Harold H. Ford
By Willits, Helmig & Bailho
Attorneys

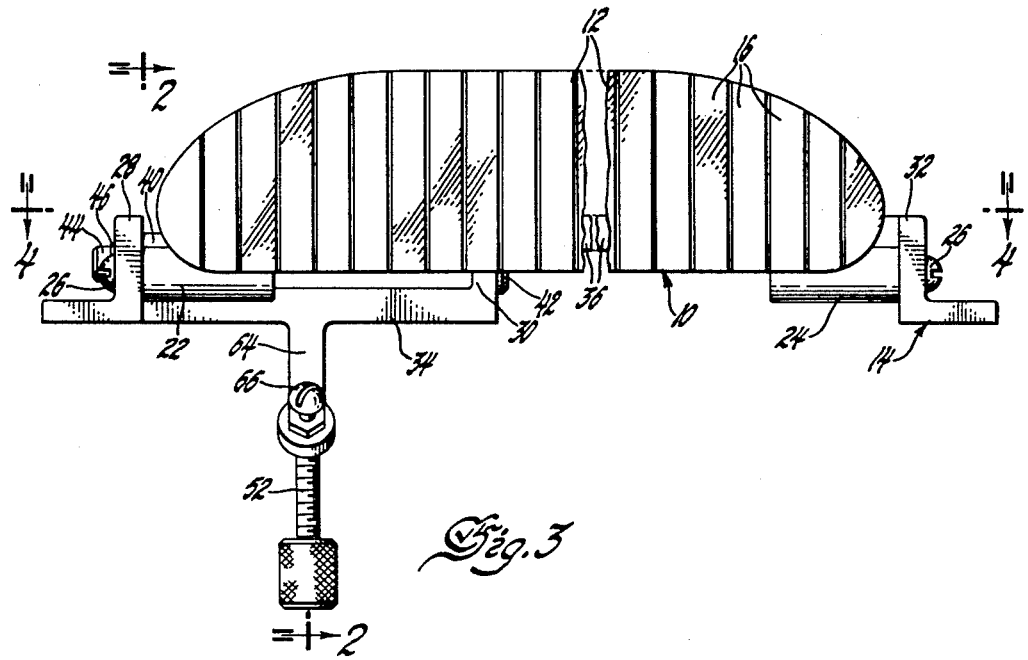
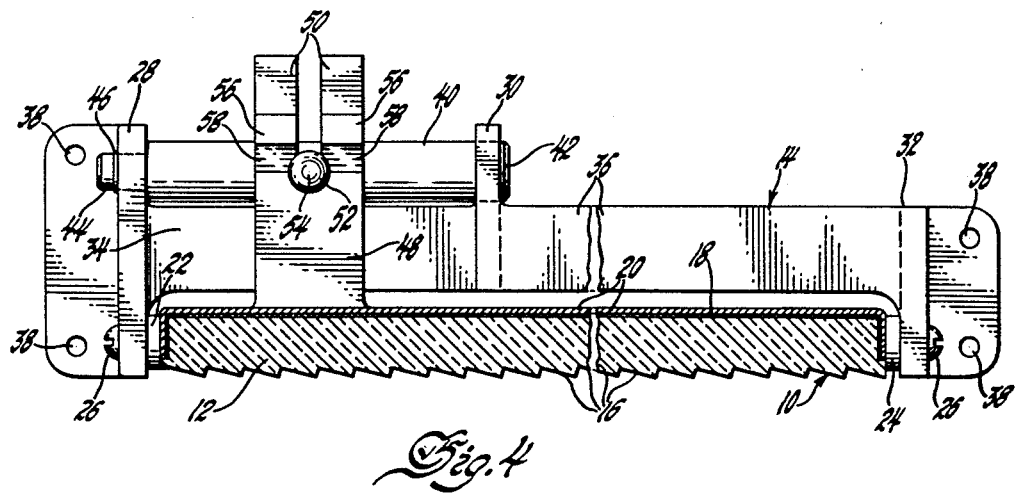

Sept. 20, 1960  H. H. FORD  2,953,062
AUTOMOTIVE VEHICLE OPTICAL SYSTEM
Original Filed April 28, 1951  3 Sheets-Sheet 3

Inventor
Harold H. Ford
By Willits, Helwig & Baillie
Attorneys

United States Patent Office 2,953,062
Patented Sept. 20, 1960

2,953,062

AUTOMOTIVE VEHICLE OPTICAL SYSTEM

Harold H. Ford, Ontario, Calif., assignor to General Motors Corporation, Detroit, Mich., a corporation of Delaware Original application Apr. 28, 1951, Ser. No. 223,616. Divided and this application Aug. 16, 1954, Ser. No. 452,506

1 Claim. (Cl. 88—86)

The present invention is a division of United States application Serial No. 223,616, filed April 28, 1951, now abandoned, and relates to optical systems for automotive vehicles and more particularly to rear view mirrors for such systems.

To afford vehicle operators an optimum view rearwardly through the rear window of an automotive vehicle, rearview mirrors are generally mounted substantially midway between the side edges of the windshield panel and above the operator's eye. Because of the optical characteristics of reflecting surfaces, the plane of the reflecting surface requires inclination to the longitudinal axis of the vehicle to accommodate the reflecting surface to the operator whose operating position is generally either to the right or left of the vehicle center line. Such an inclination with the conventional type of mirror having its reflecting surface in a common plane, effects an unsymmetrical appearance of the mirror body with respect to the portion of the vehicle to which it is attached.

Accordingly, it is an object of the present invention to provide a mirror so constructed and arranged that it may be symmetrically mounted substantially midway between the side edges of the windshield panel of an automotive vehicle to provide an operator with an optimum view of areas rearward of the vehicle through the rear window.

It is another object to provide an automotive vehicle rear-vision optical system in which a rear-vision mirror may be mounted below the windshield so as not to obstruct the vehicle operator's forward view through the windshield.

This and other objects may be attained in accordance with the present invention by providing an adjustable mirror body having a plurality of adjacent mirror elements aligned in a row with the reflecting surfaces of each of such elements in spaced parallel planes inclined to the body of the mirror.

Figure 1:
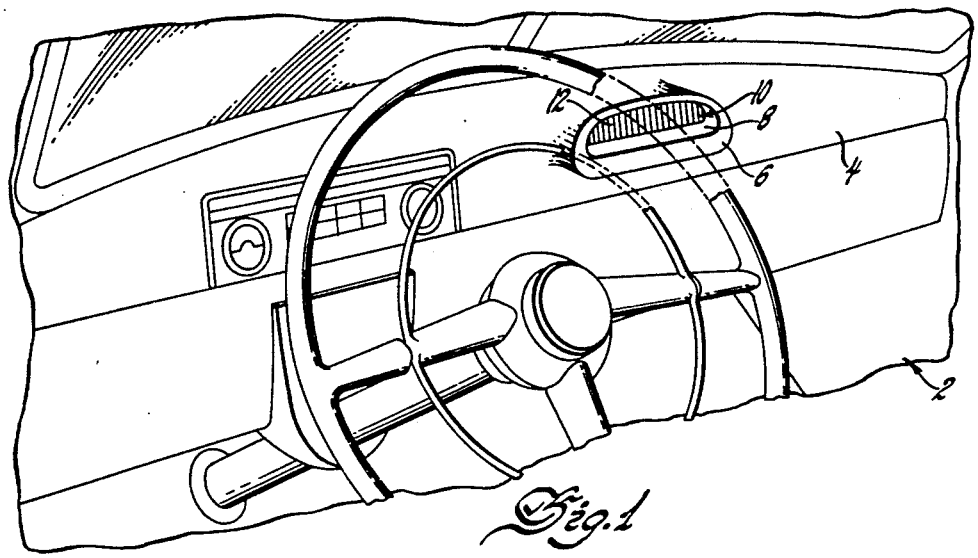
Figure 2:
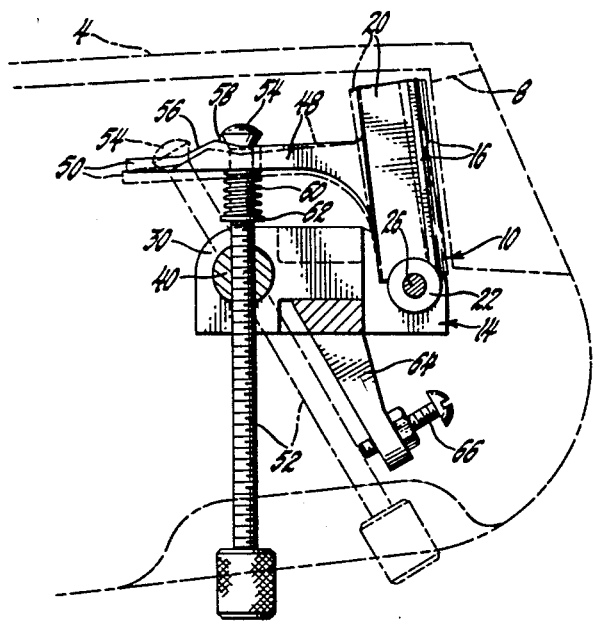
Figure 5:
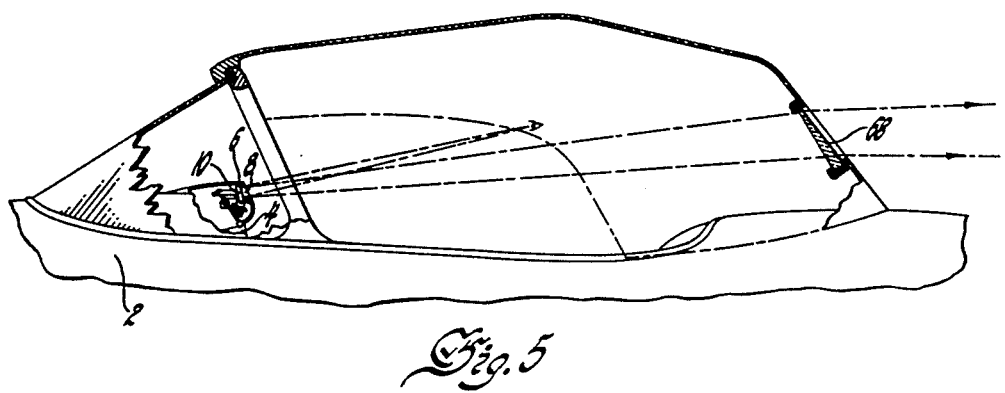
Figure 6:
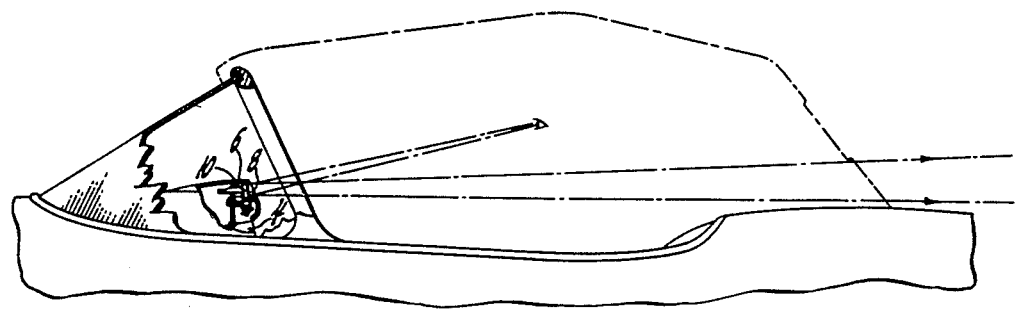

For a better understanding of the invention, reference may be had to the drawings in which Figure 1 is a fragmentary perspective view of an automotive vehicle cab structure illustrating a mirror embodying the present invention mounted in the instrument panel; Figure 2 is a side elevational view partly in cross section of the mirror assembly mounted in the instrument panel with a cross section of the instrument panel being shown by broken lines; Figure 3 is a front elevational view partly broken away of the mirror assembly and Figure 4 is a plan view similar to Figure 3 with parts broken away and parts in cross section; Figure 5 is a fragmentary side elevational view of a vehicle cab structure illustrating the relative positions of the mirror mounted in the dash panel and the rear window and Figure 6 is a view similar to Figure 5 with the top retracted.

Referring now to the drawings and particularly to Figure 1 there is illustrated a fragmentary view of an automotive vehicle cab structure 2 including an instrument panel 4. Substantially midway between the side edges of the instrument panel 4 there is formed an outwardly projecting portion 6 with an aperture or window 8 formed in the front panel. This portion provides a housing for mounting a mirror 10 embodying the present invention with the body of the mirror and the body trunnions extending at right angles to the longitudinal axis of the vehicle.

Referring now to Figures 2, 3 and 4 of the drawings, the mirror is illustrated as comprising a reflecting body 12 pivotally mounted for adjustment to a plurality of reflecting positions on a supporting bracket 14.

As shown the reflecting body 12 is formed with a plurality of adjacent elongated reflecting plane surfaces 16 aligned in a row across the body with the planes of the reflecting surfaces inclined to the plane of the back surface 18. In this connection I have found that for positioning the mirror in the housing 6, the reflecting surfaces 16 are arranged to be angularly inclined to the body of the mirror, the angle of inclination being predetermined to reflect light to the vehicle operator in the normal operating position to the left or right of the longitudinal centerline of the vehicle. The body may be made of any suitable material such as glass or thermosetting plastic to which a reflecting coating of material will adhere. In Figures 2, 3 and 4 the body 12 is shown as being solid with the plurality of reflecting surfaces being cut to form a serrated front face on the body. Of course it will be obvious that such a reflecting body is adapted to many different types of constructions and materials. The reflecting body is supported in a dish-shaped metal housing 20 and is secured in the housing by any suitable fastening means. As shown, the reflecting body 12 is secured in the housing 20 by an adhesive bonding cement.

The housing 20 is provided at its opposite ends with internally threaded tubular members 22 and 24 which are secured thereto by soldering and are adapted to receive the threaded members 26 to pivotally secure the housing 18 and body 12 in the supporting bracket 14.

The supporting bracket 14 comprises a plurality of spaced supporting portions 28, 30 and 32 interconnected by laterally offset ribs 34 and 36. The mirror 10 is shown as being pivotally supported between the portions 28 and 32 which are also provided with laterally extending attaching portions having apertures 38 for securing the bracket to the instrument panel 4. Positioned for limited rotary movement between the supporting portions 28 and 30 is a cylindrical member 40 having one end journaled in the supporting portion 30 and the other end 42 of reduced diameter journaled in supporting portion 28. The cylindrical member 40 is secured against lateral movement in the supporting portions 28 and 30 by a split ring clamp 46 of resilient wire which seats in a circumferential groove on the reduced end 44.

To provide for pivotal adjustment of the mirror 10 in the bracket 14, the housing 20 is provided with a transversely extending arm 48 with a bifurcated end portion 50 adapted to receive the shank of an adjusting screw 52 threadedly received in the cylindrical member 40. The screw is provided with an enlarged head 54 which slidably engages merging inclined surface portions 56 and 58 on the bifurcated end portions of the arm 48. With this arrangement of the inclined surface portions 56 and 58 on the arm 48, there are provided two detent positions of adjustment for the mirror without rotation of the adjusting screw, see Figure 2. Yielding engagement between the enlarged head 54 and the merging inclined portions 56 and 58 on the arm 48 is obtained by providing a helical member 60 on the shank of the threaded member 52 with one end yieldingly engaging the arm 48 and the other end in engagement with a stop 62 fixedly attached to the shank of the adjusting screw. Further fine adjustment of the mirror to accommodate the light rays reflected from the mirror to the eyes of operators of different height is obtained by rotation of the threaded adjusting screw 52. Rotation of the adjusting screw 52 causes the mirror body 12 to rotate on its trunnions 26 to accommodate light reflection from the mirror elements to the eye of operators of different vertical height position within the cab structure. Once being adjusted by rotation to accommodate the mirror angle to the eye position of one operator, the adjusting screw may be moved forwardly or backwardly to either of the detent positions for the enlarged head 54 of the screw. An arm 64 depending downwardly from the rib 34 carries a threaded adjustable stop 66 which limits the counterclockwise movement of the adjusting screw 52 about the axis of the cylindrical member 40.

The mirror assembly described hereinabove particularly in connection with the adjusting mechanism is especially adapted for use with automotive vehicles with folding cab structures such as illustrated in Figures 5 and 6 and more commonly known to the trade as "Convertibles." With such vehicles the cab structure is generally retractible to a folded position within the body structure and both the retracted cab structure and body structure within which it is concealed are below the level of the projecting portion 6 of the instrument panel. Accordingly, with the mirror mounted within the instrument panel as shown in Figure 2 and with the cab structure retracted to be concealed within the body panels, the cab structure does not form an obstruction to the operator's rearview mirror vision of objects to the rearward of the vehicle. Consequently, the mirror may be adjusted to the full line position of the mirror as illustrated in Figure 2 and the corresponding position illustrated in Figure 6. This adjustment may be obtained as pointed out heretofore by a forward movement of the adjusting member 52 about its trunnion 40. In this connection it will be obvious from Figure 6 that with the cab structure retracted into the body panels, the rear body panels are sufficiently below the level of the position of the mirror so as not to interfere with a rear mirror view of the rearward areas. With the cab structure raised, the rear window of the cab structure may be positioned above the level of the mirror in its position of mounting within the instrument panel. Under such conditions the operator's use of the mirror to view rearward areas through the window may be obstructed. To adapt the mirror to use under such conditions, the mirror may be adjusted to its broken line position illustrated in Figure 2 and the rear window 68 provided with prismatic lens characteristics adapting the rear window to bend light rays from rearward areas downwardly to the light incident surface of the mirror. In this connection it will be clear from Figure 5 that with the cab structure raised the rear window 68 is positioned in the cab structure with the center of the window at substantially the same level as the operator's eye to afford the operator a direct rear view through the window without lowering the eye level. With the window 68 in this position in the cab structure portions of the cab structure below the window form an obstruction to indirect rear view mirror vision especially of objects in line with or below the level of the window. Consequently, a rear window 68 of wedge shape is provided. The window is positioned in the cab structure, as shown, with the window tapering to its narrowest section adjacent the upper edge of the window area.

With such an arrangement it will be seen that light entering the window will be refracted downwardly along the broken lines of Figure 5 to the reflecting surface of the mirror in the adjusted position of the mirror corresponding to the broken line position of Figure 2.

A mirror constructed and arranged in the manner which I have described is especially suitable for mounting substantially midway between the side edges of the windshield panel with the body of the mirror symmetrically arranged with respect to the instrument panel.

While there has been illustrated one particular embodiment of my invention especially adapted for mounting in the instrument panel of an automotive vehicle, it will be understood, of course, that I do not wish to be limited thereto since many modifications may be made without departing from the spirit of the invention and I, therefore, contemplate by the appended claim to cover any such modifications which fall within the true spirit and scope of my invention.

What I claim as new and desire to obtain by United States Letters Patent is:

In an automotive vehicle, an instrument panel having an opening therein, a retractable cab structure having a prismatic rear window, a rear view mirror mounted in said instrument panel opening on a support for pivotal movement about a horizontal axis, said mirror comprising a body member provided with a plurality of mirror elements having plane mirror surfaces, said elements being arranged in a row with said surfaces being angularly inclined to the plane of said body member and in equally spaced parallel planes, and means for adjusting said mirror to predetermined positions to provide rearward vision through said window with said cab structure raised and directly rearwardly of said vehicle with said cab structure lowered and for further adjusting the mirror in any of its predetermined positions, said adjusting means including an arm projecting from the rear surface of said mirror and an adjusting screw engaging said arm, said adjusting screw being pivotally mounted on a horizontal axis on said support for rotation about said axis to tilt said mirror to the predetermined positions and being threadedly engaged with said support to provide said further adjustment of said mirror within its predetermined positions.

References Cited in the file of this patent

UNITED STATES PATENTS

| | | |
|---|---|---|
| 1,376,377 | Mee | Apr. 26, 1921 |
| 1,907,800 | Harrington | May 9, 1933 |
| 1,972,320 | Schaal | Sept. 4, 1934 |
| 1,985,179 | Luthringshavsen et al. | Dec. 18, 1934 |
| 2,066,982 | Kronquist | Jan. 5, 1937 |
| 2,135,262 | Schumacher | Nov. 1, 1938 |
| 2,161,006 | Bixel et al. | June 6, 1939 |
| 2,570,357 | Martin | Oct. 9, 1951 |
| 2,573,812 | Schroeder | Nov. 6, 1951 |
| 2,582,651 | Peterson | Jan. 15, 1952 |

FOREIGN PATENTS

| | | |
|---|---|---|
| 279,893 | Great Britain | Mar. 15, 1928 |
| 422,639 | Great Britain | Jan. 16, 1935 |
| 462,192 | Great Britain | Mar. 4, 1937 |
| 462,649 | Italy | Mar. 29, 1951 |